United States Patent [19]

Waszkiewicz

[11] Patent Number: 4,841,142
[45] Date of Patent: Jun. 20, 1989

[54] DOCUMENT SCANNER WITH RESOLUTION SELECTION CONTROL

[75] Inventor: Paul Waszkiewicz, Agoura Hills, Calif.

[73] Assignee: Photon Devices, Ltd., Newport Beach, Calif.

[21] Appl. No.: 116,517

[22] Filed: Nov. 3, 1987

[51] Int. Cl.4 ............................................... H01J 5/16
[52] U.S. Cl. ....................................... 250/227; 250/578
[58] Field of Search ............... 250/578, 227, 208, 209; 358/294, 293

[56] References Cited

U.S. PATENT DOCUMENTS 4,644,409 2/1987 Fuchs ................................... 358/256
4,674,834 6/1987 Margolin ............................ 250/227

Primary Examiner—David C. Nelms
Attorney, Agent, or Firm—Stanger, Michaelson, Reynolds, Spivak & Tobia

[57] ABSTRACT

A resolution-select arrangement is provided for a fiber optic document scanner (or scope) having its exit field coupled to an array of discrete sensors. An initialization procedure provides an address string which associates at least one address of the sensor array with each of many of the positions of a light beam incremented along the axis of the entrance field. Subsets of the longest address string are derived and stored separately in consecutive ROM addresses starting at a corresponding start address. Resolution selection, conveniently under software control, selects the starting address corresponding to the desired resolution and increments through consecutive addresses of ROM where the associated address string is stored.

8 Claims, 1 Drawing Sheet

DOCUMENT SCANNER WITH RESOLUTION SELECTION CONTROL

FIELD OF THE INVENTION

This invention relates to document scanners and scopes and more particularly to such devices composed of radiation conduits such as fiber optic bundles.

BACKGROUND OF THE INVENTION

U.S. Pat. No. 4,674,834 issued June 23, 1987 to G. D. Margolin and assigned to the assignee of the present application discloses a fiber optic technology for implementing document scanners and scopes. The technology utilizes a noncoherent fiber optic bundle where the entrance field is constrained into an ideally linear geometry to correspond to the width of a document to be scanned. The exit field of the bundle is constrained into a rectangular geometry and fixed with respect to a sensor array of like geometry. The sensor array is composed of discrete sensors which can be accessed conveniently on a random access basis.

Because there is no positional correspondence between fiber ends in the entrance field and the fiber ends of corresponding fibers in the exit field, that positional information has to be obtained. The information is obtained by what can be visualized as asking each fiber where its exit end is with respect to the sensor array.

The positional information is obtained by passing light into the fibers of the entrance field one at a time and interrogating the sensor array to ascertain the address of the illuminated sensor in each instance. In this manner, a sensor address can be assigned to correspond to the exit position of a fiber which has its input end illuminated. By repeating this procedure, an address string is formed which, when clocked, produces the sequence of exit positions (i.e. the corresponding addresses) for the sequence of fiber ends in the entrance field.

The "initialization" procedure is simple to visualize as described, but it cannot be implemented so easily. It is very difficult to move a beam to the position of a fiber end in the entrance field. The fibers are tiny (a fraction of the size of a human hair) and their locations are not known. They are constrained to an ideally linear arrangement but they are unevenly spaced, laterally displaced and bunched up. A simple procedure for initialization is disclosed in co-pending application Ser. No. 894,792 filed Aug. 8, 1986 and also assigned to the assignee of the present application.

In any case, a string of sensor addresses is formed for organizing the pixels transmitted by the fiber optic bundle. That string of addresses is used to interrogate only those addresses of the sensor array if the array is organized on a random access basis. The string of addresses may be used to define the sequence of significant addresses if the entire memory is to be read out as would be the case with a CCD sensor array.

This initializing technique also is useful for a coherent fiber optic bundle which is coupled to an array of discrete sensors at its exit end. Although such an operation would be considered useless because all the positional information is already known for coherent bundles, problems do occur with such bundles when coupled to an array of discrete sensors. Specifically, if the fiber size is greater than the sensor size, defects occur in the image. The defects are due to aliasing, Moire patterns, misalignment as well as size differences. All such defects are eliminated by initialization. The initialization of coherent fiber optic bundles also is disclosed in the above-mentioned co-pending patent application.

In a typical implementation of a document scanner with a fiber optic bundle, thousands of fibers are employed over an eight and one-half inch linear entrance field. If five thousand fibers are used and, all fibers are usable, about six hundred bits per inch (bpi) resolution can be achieved. But it is clear that one hundred bpi, two hundred bpi, two hundred forty bpi, three hundred bpi, four hundred and eighty bpi, etc. are also desirable for speed and compatibility consideration. This invention is directed at a simple arrangement for achieving different resolution levels with a single fiber optic scanner.

BRIEF DESCRIPTION OF AN ILLUSTRATIVE EMBODIMENT OF THE INVENTION

In accordance with the principles of the present invention, a separate address string is defined to correspond to each resolution level which may be desired. All the address strings are stored, conveniently sequentially in a read only memory (ROM). An address generator, composed of a resettable counter, is adapted to interrogate the ROM. A control circuit is adapted under software control to generate a selected starting address at which the first address of a selected address string is stored in ROM and a clock increments the address generator. In this manner, a plurality of address strings corresponding to a plurality of resolution levels is stored and one of the plurality is selected under software control.

In another embodiment, a ROM stores a single address string which is a sequence of addresses of all useful sensors selected during the initialization process. An address generator is adapted to select from the single string the address subset sequence which yields the desired resolution level.

BASIC DESCRIPTION OF THE DRAWING

FIGS. 1 and 2 are block diagrams of different portions of a resolution select system organization in accordance with the principles of this invention.

DETAILED DESCRIPTION

Figure 1:
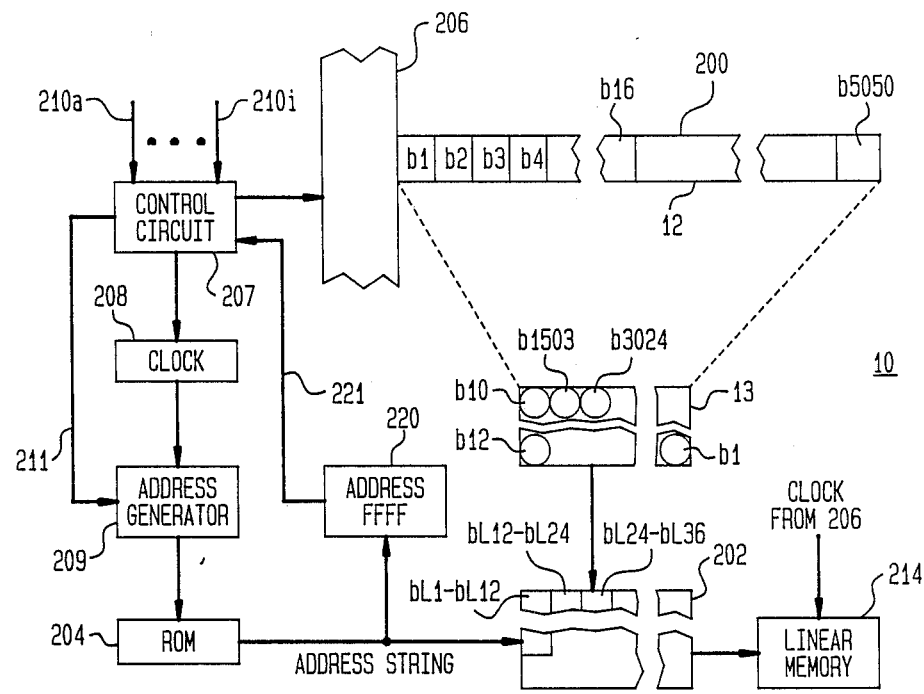

FIG. 1 shows a block diagram of a resolution select system 10. In the figure, the entrance field and the exit field of an illustrative fiber optic bundle are represented at 12 and 13 respectively.

The fiber ends in the entrance field are, of course, round and they are not uniform in placement or spacing. Nonetheless, the fibers are represented in idealized form as consecutive bits of information b1, b2, b3—b5050 constrained into an idealized linear entrance field represented by rectangle 200.

The exit field is represented by rectangle 13. The fiber ends in the exit field may be in unpredictable positions if the fiber optic bundle is assumed to be noncoherent. We will assume the noncoherent case here for illustrative purposes. Thus, bit b12 may be located in the lower left of the exit field as shown whereas bit b16 may be located at the upper left. Similarly, bit b1 may be located in the lower right of the exit field whereas bit b3024 may be located at the top of the exit field near the left side also as shown.

A sensor array 202 is coupled in fixed position with respect to the exit field. In practice, the array is physically attached to the exit end of the fiber optic bundle. Available sensor arrays are of a size such that a fiber is big enough to cover twelve or so sensors. Thus, if the sensor array is thought of as comprising a plurality of imaginary squares each including twelve sensors, one fiber end in the exit field would correspond to each square. Such imaginary squares are shown in rectangle 202 of FIG. 1. It can be seen that a fiber having its entrance end at b16 in rectangle 200 of FIG. 1, has its exit end at b16 of rectangle 201 and that exit end corresponds to one of the imaginary squares (bL1—bL12) of rectangle 202. The initialization procedure selects at least a single address out of those corresponding twelve possible addresses (bL1—bL12).

The selected sequence of addresses of sensors illuminated as the initializing beam is moved in equal increments smaller than a fiber width along the axis of the entrance field, is stored in ROM 204. Typically, the illumination of incremental positions along the axis of the entrance field originate in a slit having a width of about 0.2 mils and the fibers have diameters of about 1.5 to 1.7 mils. Thus, the (not shown) slit is moved about 0.2 mils (5 microns) each time the sensor array is interrogated. The computer determines the sequence of selected addresses each corresponding to the maximum localized light affect on the sensor array as disclosed in the above-mentioned co-pending application.

An address is selected for slit positions at which a maximum occurs in the number of sensors activated in one localized area of the array. Under ideal conditions, this means that an address is generated for each fiber in the array. An address string with 5500 addresses provides about 650 bpi. If we assume that a typical commercially available ROM suitable for use herein includes 16,000 addresses, only 5100 addresses are needed to store a first address string which yields a resolution of 600 bpi.

There is room in the ROM for additional address strings. Accordingly, if we store a second address string including every other address of the first string, we provide for a resolution of 300 bpi. If we generate a third address string including every third address of the first address string, we provide for a resolution of 200 bpi. If we utilize two out of three of the addresses of the first string, we provide a fourth string corresponding to a resolution of 400 bpi. In this manner, a number of address strings, each corresponding to a different resolution can be generated.

The various address strings are stored in ROM. For the address strings mentioned, 2550 (300 bpi), 2048 (240 bpi), 1724 (200 bpi) and 862 (100 bpi) addresses are needed still utilizing only a small portion of the ROM's available address space. Each of these address strings occupies a sequence of addresses starting at an associated starting address. Therefore, one of the various address strings can be selected under software control merely by selecting a corresponding starting address and enabling a clock pulse sequence to increment the addresses. It is to be noted that each address string includes addresses at widely separated locations in ROM. It is convenient to end each address string with the address FFFF commonly used to designate the last address in ROM. The system is adapted then to terminate the string when FFFF occurs.

Whatever address string is selected, each time a line of a document is scanned, the same address string is generated to organize the pixels into the sequence in which they occurred in the entrance fields. The portion of a document scanned during a scan operation corresponds to rectangle 200. The rectangle thus may be visualized as corresponding to a three-mil slice across an eight and one-half inch document. Block 206 represents a mechanical paper mover for moving a document to a next scan position (i.e. advancing the document three mils) so that rectangle 200 corresponds to the next scan segment.

The paper mover is under the control of control circuit 207. Circuit 207 also is connected to clock 208 and to address generator 209. Clock circuit 208 also is connected to address generator 209. Control circuit 207 has a plurality of inputs $210_a$—$210_i$ corresponding to the number of address strings. These inputs, which may comprise keyboard inputs, select a particular address string corresponding to a desired resolution. Control circuit 207 responds by applying the corresponding starting address to address generator 209 via line 211. Address generator 209 is a resettable counter. Control circuit 207, in response to a resolution-select signal, selects a starting address which address generator 209 applies to ROM 204. When control circuit 207 selects the starting address it also initiates clock 208. Clock 208, in turn, increments address generator 209 to generate the address string stored in the sequence of addresses starting with the selected starting address. The ROM, in turn, generates the stored sequence of addresses determined during initialization, applying those addresses to the sensor array 202. The output of array 202 is applied to linear memory (buffer) 214.

Figure 2:
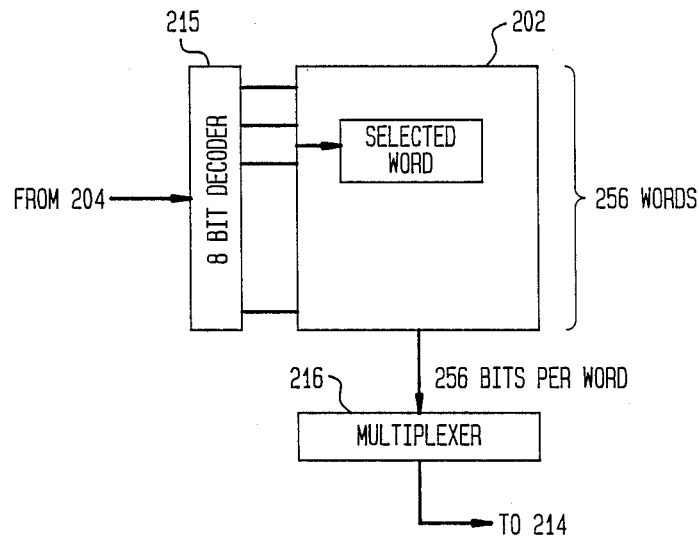

FIG. 2 is a block diagram of sensor array 202 along with its associated input and output circuitry. The circuit includes an 8-bit decoder 215 at the input to array 202 and a 256 bit per word output multiplexer (MUX) 216. Each address in the address string from ROM 204 is decoded by decoder 215 to select a particular word in the sensor array. Each time a word in the array is selected, array 202 applies the 256 bits of the selected word to multiplexer 216. MUX 216 is operative to apply a binary 1 or 0 to linear memory 214 of FIG. 1 depending upon whether the selected block of bit addresses (i.e. bL13 of FIG. 1) is illuminated or not in the instant scan period.

It is clear that ROM 204 stores a plurality of address strings, each string stored conveniently at consecutive ROM addresses starting at an associated starting address, each stored address string ending with address FFFF. Note that the address string referred to herein is generated during an initialization procedure. Those address strings are stored in a sequence of ROM addresses (not a string). The address FFFF refers to the end of a stored address string—that is, the last sensor address. The address FFFF does not refer to the last ROM address.

Block 220 is a logic circuit comprising a pair of flip-flops the input thereof being connected to the output of ROM 204. The address string from ROM 204 is applied to the input of block 220 which is adapted to respond to address FFFF to provide a stop signal to control circuit 207 via line 221 concluding the instant scan cycle and enabling the next.

All the circuitry of FIGS. 1 and 2 can be implemented by a gate array except the ROM. The ROM typically will be too large to be implemented this way if it stored a number of address strings. In an alternative embodiment a variable address generator can be used instead to select from ROM a subset of a single address string stored during initialization. Thus, the address generator and clock can be adapted to generate every other ROM address, every third address, —to produce an address string (subset) corresponding to the desired resolution. Operation is essentially the same except that a sufficiently small ROM can be used to allow implementation in gate arrays. It is intended that such an alternative embodiment is encompassed by the following claims.

The address string is employed to interrogate only the selected addresses determined during initialization. This is a big advantage because if the sensor array is say 65000 addresses only a small number of those (equal to the number of fibers used) need be interrogated. This is particularly useful for sensor arrays accessible on a random access basis because a great deal of time is saved. On the other hand, if a sequentially-accessed sensor array is used, the address string may be used to identify the significant addresses out of the continuous serial output stream from such a memory.

What Is claimed:

1. A scanner including a plurality of radiation conduits configured to define an entrance field and an exit field having first and second geometries, respectively, an array of discrete sensors energy-coupled to said plurality of conduits at said exit field, and circuit means connected to said sensor array, said circuit means being adapted to store those outputs from said sensor array which are located at addresses in one of a plurality of address strings which is a subset of the totality of addresses in said array, said circuit means including means for selecting one of said plurality of address strings.

2. A sensor in accordance with claim 1 wherein said plurality of radiation conduits comprises a fiber optic bundle.

3. A scanner in accordance with claim 2 wherein said fiber optic bundle is noncoherent.

4. A scanner in accordance with claim 2 wherein said fiber optic bundle is coherent.

5. A scanner in accordance with claim 3 wherein said circuit means include a ROM and said ROM is adapted for storing at least first and second address strings corresponding to first and second resolutions, respectively, said ROM being adapted to interrogate only the addresses of said sensor array which appear in a selected one of said address strings, said circuit means also including means for selecting one of said address strings.

6. A scanner in accordance with claim 5 wherein each of said address strings is stored in consecutive addresses in ROM starting at an associated starting address, and said means for selecting is adapted to select a starting address and to initiate means for incrementing the addresses in ROM starting with the selected ROM address.

7. A scanner in accordance with claim 6 wherein each of said address strings ends with address FFFF and said circuit means includes means responsive to the appearance of address FFFF for terminating a scan operation.

8. A scanner in accordance with claim 4 wherein said circuit means includes a ROM and said ROM is adapted for storing at least first and second address strings corresponding to first and second resolutions, respectively, said ROM being adapted to interrogate only the addresses of said sensor array which appear in a selected one of said address strings, said circuit means including means for selecting one of said address strings.

* * * * *